(12) United States Patent
Hong

(10) Patent No.: US 9,880,617 B2
(45) Date of Patent: Jan. 30, 2018

(54) ELECTRONIC DEVICE AND METHOD OF CONTROLLING DISPLAY OF ELECTRONIC DEVICE

(71) Applicant: Samsung Electronics Co., Ltd., Gyeonggi-do (KR)

(72) Inventor: Seung-Su Hong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 95 days.

(21) Appl. No.: 14/873,936

(22) Filed: Oct. 2, 2015

(65) Prior Publication Data

US 2016/0098082 A1 Apr. 7, 2016

(30) Foreign Application Priority Data

Oct. 2, 2014 (KR) ........................ 10-2014-0133342

(51) Int. Cl.
*G06F 3/041* (2006.01)
*G06F 3/01* (2006.01)
(Continued)

(52) U.S. Cl.
CPC ........... *G06F 3/013* (2013.01); *G02B 27/017* (2013.01); *G06F 3/012* (2013.01); *G06F 3/0416* (2013.01); *G06F 3/0488* (2013.01); *G06F 1/1632* (2013.01)

(58) Field of Classification Search
CPC .......... G06F 3/012; G06F 3/013; G06F 3/016; G06F 3/0362; G06F 3/041; G06F 3/0412; G06F 3/0416; G06F 3/0488; G06F 1/1632; G09G 5/005; G09G 5/14; G09G 2340/0407; G09G 2320/10; G02B 27/017; G02B 27/022; G02B 27/028; G02B 27/0093; G02B 27/0176; G02B 27/1072; G02B 2027/014; G02B 2027/0169; G02B 2027/0132; G02B 2027/0156;
(Continued)

(56) References Cited

U.S. PATENT DOCUMENTS 6,212,020 B1 4/2001 Ahlgren et al.
2006/0146041 A1* 7/2006 Brink .................... G09G 3/002
345/204
(Continued)

FOREIGN PATENT DOCUMENTS

EP 0344881 12/1989
EP 1 452 147 9/2004
(Continued)

OTHER PUBLICATIONS

International Search Report dated Jan. 14, 2016 issued in counterpart application No. PCT/KR2015/010398, 9 pages.
(Continued)

*Primary Examiner* — Kent Chang
*Assistant Examiner* — Mark Edwards
(74) *Attorney, Agent, or Firm* — The Farrell Law Firm, P.C.

(57) ABSTRACT

Methods and apparatuses are provided for controlling a display of an electronic device. One or more reference points are detected at a touch panel of the electronic device. Screen display positions for a Head Mounted Display (HMD) mode are determined based on positions of the one or more reference points. Screens in the HMD mode are displayed at the screen display positions.

17 Claims, 17 Drawing Sheets

(51) Int. Cl.
*G06F 3/0488* (2013.01)
*G02B 27/01* (2006.01)
*G06F 1/16* (2006.01)

(58) Field of Classification Search
CPC .......... G02B 2027/0178; G06T 19/006; H04N 5/2252; H04B 2001/03
See application file for complete search history.

(56) References Cited

U.S. PATENT DOCUMENTS

| | | | |
|---|---|---|---|
| 2010/0079356 A1* | 4/2010 | Hoellwarth | G02B 27/017 345/8 |
| 2011/0181960 A1 | 7/2011 | Tanljlr | |
| 2013/0154974 A1* | 6/2013 | Murata | G06F 3/0488 345/173 |
| 2014/0098009 A1 | 4/2014 | Prest et al. | |
| 2016/0337491 A1* | 11/2016 | Buckley | G02B 27/0176 |

FOREIGN PATENT DOCUMENTS

| | | |
|---|---|---|
| EP | 2 605 118 | 6/2013 |
| WO | WO 01/27684 | 4/2001 |

OTHER PUBLICATIONS

European Search Report dated Feb. 1, 2016 issued in counterpart application No. 15188107.5-1553, 6 pages.

\* cited by examiner

ELECTRONIC DEVICE AND METHOD OF CONTROLLING DISPLAY OF ELECTRONIC DEVICE

PRIORITY

This application claims priority under 35 U.S.C. §119(a) to Korean Application Serial No. 10-2014-0133342, which was filed in the Korean Intellectual Property Office on Oct. 2, 2014, the content of which is incorporated herein by reference.

BACKGROUND OF THE INVENTION

1. Field of the Invention

The present invention relates generally to an electronic device, and more particularly, to a method of controlling a display of an electronic device.

2. Description of the Related Art

An electronic device that is provided to be worn on the body is commonly referred to as a wearable device. The wearable device may be a head mounted electronic device such as, for example, a Head Mounted Display (HMD). Types of HMDs may be divided into a transparent type, which provides an Augmented Reality (AR), and an opaque type which provides a Virtual Reality (VR).

The transparent type of HMD composes and combines virtual targets or objects based on the real world using characteristics of a semi permeable lens, to provide additional information which is difficult to be acquired based on the real world alone. The opaque type of HMD has two displays that the user views, and provides excellent immersion for the user since the user can enjoy contents (games, movies, streaming, broadcasts and the like) provided by an external input through an independent screen.

When various sizes and forms of display devices are mounted on the wearable device, screen positions of the display devices may not accurately fit positions of a user's left and right eyes. Thus, the user may not experience the full effect of the wearable device. The user may manually adjust the positions of the display devices whenever the whenever the wearable device is used. A structure that enables these adjustments may have an increased complexity. Further, when the display device moves due to a physical impact, the position of the display device changes and may no longer be positioned according to the user's eyes.

SUMMARY OF THE INVENTION

The present invention has been made to address at least the above problems and/or disadvantages and to provide at least the advantages described below. Accordingly, an aspect of the present invention provides an electronic device that can determine reference points of screen display positions by detecting conductive parts included in the wearable device through a touch pad of the display device when the display device is mounted on the wearable device, and a method of controlling a display of the electronic device.

In accordance with an aspect of the present invention, an electronic device is provided that includes a touch panel configured to detect one or more reference points. The electronic device also includes a processor configured to determine screen display positions for an HMD mode based on positions of the one or more reference points. The electronic device further includes a display unit configured to display screens in the HMD mode at the screen display positions.

In accordance with another aspect of the present invention, a wearable device is provided that includes a cover having a front surface to which a display device is mounted. The wearable device also includes a support configured to attach the wearable device to a head of a user. The wearable device additionally includes lens units disposed on portions of the front surface corresponding to left and right eyes of the user. The wearable device further includes one or more conductive parts disposed on the front surface for contact with the display device.

In accordance with another aspect of the present invention, a method is provided for controlling a display of an electronic device. One or more reference points are detected at a touch panel of the electronic device. Screen display positions for a Head Mounted Display (HMD) mode are determined based on positions of the one or more reference points. Screens are displayed in the HMD mode at the screen display positions.

In accordance with another aspect of the present invention, a computer-readable recording medium is provided for recording a program to be performed on a computer. The program includes a command executable to perform the process of: determining, by a processor, screen display positions for a Head Mounted Display (HMD) mode based on one or more reference points detected by a touch panel of an electronic device, when the program is executed by the processor; and providing a command to display screens in the HMD mode at the screen display positions.

In accordance with another aspect of the present invention, an electronic device is provided that includes a touch panel configured to detect one or more reference points using one or more conductive parts, which the touch patent contacts when the electronic device is mounted on a wearable device. The electronic device also includes a processor configured to determine first and second screen display positions, corresponding to positions of first and 15 second lens units of the wearable device, based on positions of the one or more reference points. The electronic device further includes a display unit configured to display first and second screens at the first and second screen display positions.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
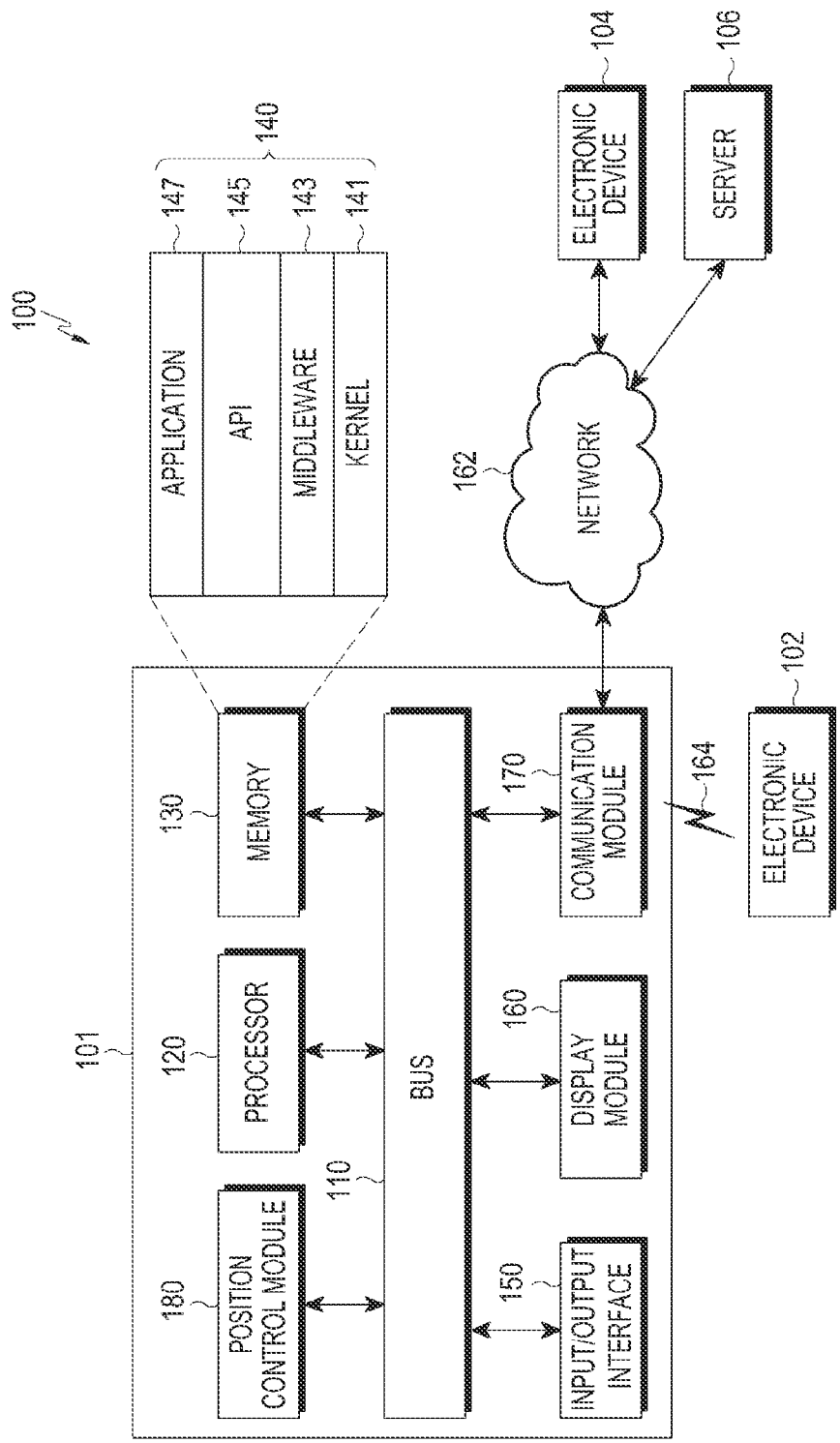
FIG. 1 is a diagram illustrating a network environment, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Herein, the expressions "have", "may have", "include" and "may include" refer to the existence of a corresponding feature (e.g., numerical value, function, operation, or components, such as elements), and does not exclude the existence of additional features.

Herein, the expressions "A or B", "at least one of A or/and B", and "one or more of A or/and B" may include all possible combinations of the items listed. For example, the expression "A or B", "at least one of A and B", or "at least one of A or B" refers to all of (1) including at least A, (2) including at least B, or (3) including both A and B.

The expressions "a first", "a second", "the first", and "the second", as used herein, may modify various components regardless of their order and/or the importance, but does not limit the corresponding components. The expressions may be used to distinguish a component element from another component element. For example, a first user device and a second user device may indicate different user devices regardless of the sequence or importance thereof. Additionally, a first element may be referred to as a second element, and similarly, a second element may be referred to as a first element without departing from the scope of the present invention.

When one element (e.g., a first element) is described as being (operatively or communicatively) "coupled with/to" or "connected to" another element (e.g., a second element), it should be construed that the one element is directly connected to the other element or the one element is indirectly connected to the other element via yet another element (e.g., a third element). Conversely, when it is described that one element (e.g., a first element) is "directly coupled" or "directly connected" to another element (e.g., a second element), it may be construed that an additional element does not exist between the one element and the other element.

The expression "configured to", as used herein, may be exchanged with, for example, "suitable for", "having the capacity to", "designed to", "adapted to", "made to", or "capable of", based on the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations, or a generic-purpose processor (e.g., central processing unit (CPU) or application processor (AP)) that can perform the corresponding operations by executing one or more software programs stored in a memory device.

The terms used herein are only used to describe specific embodiments, and are not intended to limit the embodiments of the present invention. As used herein, singular forms may include plural forms as well, unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined herein. In some cases, even a term that is defined herein should not be interpreted to exclude embodiments of the present invention.

The electronic device may be embodied as at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., an HMD such as electronic glasses, electronic clothes, an electronic bracelet, an electronic necklace, an electronic appcessory, electronic tattoos, or a smart watch).

According to an embodiment of the present invention, the electronic device may be embodied as a smart home appliance. The home appliance may include at least one of, for example, a television, a digital versatile disc (DVD) player, an audio player, a refrigerator, an air conditioner, a vacuum cleaner, an oven, a microwave oven, a washing machine, an air cleaner, a set-top box, a home automation control panel, a security control panel, a TV box, a game console, an electronic dictionary, an electronic key, a camcorder, and an electronic photo frame.

According to another embodiment of the present invention, the electronic device may be embodied as at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in a bank, a point of sales (POS) device in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to an embodiment of the present invention, the electronic device may be embodied as at least one of a part of furniture or a building/structure, an electronic board, an electronic signature receiving device, a projector, and various kinds of measuring instruments (e.g., a water meter, an electric meter, a gas meter, and a radio wave meter). The electronic device, according to an embodiment of the present invention, may be embodied as a combination of one or more of the aforementioned various devices. According to an embodiment of the present invention, the electronic device may be a flexible device. Further, the electronic device is not limited to the aforementioned devices, and may include a new electronic device according to the development of technology Hereinafter, an electronic device, according to an embodiment of the present invention, is described with reference to the accompanying drawings. The term "user", as used herein, may indicate a person using an electronic device or a device (e.g. an artificial intelligence electronic device) using an electronic device.

FIG. 1 is a diagram illustrating a network environment, according to an embodiment of the present invention. An electronic device 101 within a network environment 100 includes at least one of a bus 110, a processor 120, a memory 130, an input/output interface 150, a display module 160, a communication module 170, and a position control module 180. The electronic device 101 may omit at least some of the above components or further include other components.

The bus 110 may include a circuit for connecting the components 110 to 180, and for transmitting communication between the components (for example, a control message and/or data).

The processor 120 may include one or more of a CPU, an AP, and a communication processor (CP). The processor 120 may control one or more other components of the electronic device 101 and/or process an operation or data related to communication.

The memory 130 may include a volatile memory and/or a non-volatile memory. The memory 130 may store, for example, commands or data related to one or more other components of the electronic device 101. According to an embodiment of the present invention, the memory 130 stores software and/or a program 140. The program 140 includes a kernel 141, middleware 143, an application programming interface (API) 145, and/or an application program (or "application") 147. At least some of the kernel 141, the middleware 143, and the API 145 may be referred to as an operating system (OS).

The kernel 141 may control or manage system resources (for example, the bus 110, the processor 120, or the memory 130) used for executing an operation or function implemented by other programs (for example, the middleware 143, the API 145, or the application program 147). Furthermore, the kernel 141 may provide an interface through which the middleware 143, the API 145, or the application program 147 may access individual components of the electronic device 101 to control or manage system resources.

The middleware 143 may serve as, for example, an intermediary such that the API 145 or the application program 147 communicates with the kernel 141 to transmit/receive data. Further, in relation to operation requests received from the applications 147, the middleware 143 may control (for example, scheduling or load-balancing) the requests by using, for example, a method of determining a sequence for using system resources (for example, the bus 110, the processor 120, the memory 130, or the like) of the electronic device 101 with respect to at least one application among the applications 147.

The API 145 is an interface by which the applications 147 control functions provided from the kernel 141 or the middleware 143, and may include, for example, at least one interface or function (for example, instructions) for file control, window control, image processing, or text control.

The input/output interface 150 may serve as an interface that can transmit commands or data input from the user or another external device to other component(s) of the electronic device 101. Further, the input/output interface 150 may output commands or data received from other component(s) of the electronic device 101 to the user or another external device.

The display module 160 may include, for example, a liquid crystal display (LCD), a light emitting diode (LED) display, an organic LED (OLED) display, a micro electro mechanical system (MEMS) display, or an electronic paper display. The display 160 may display various types of contents (for example, text, images, videos, icons, or symbols) for users. The display module 160 may include a touch screen, and may receive, for example, a touch, gesture, proximity, or hovering input by using an electronic device or a part of the user's body.

The communication module 170 may configure communication between, for example, the electronic device 101 and an external device (for example, a first external electronic device 102, a second external electronic device 104, or a server 106). For example, the communication module 170 may be connected to a network 162 through wireless or wired communication to communicate with an external device (for example, the second external electronic device 104 or the server 106).

The wireless communication may include at least one of long term evolution (LTE), long term evolution-advanced (LTE-A), code division multiple access (CDMA), wideband CDMA (WCDMA), universal mobile telecommunications system (UMTS), wireless broadband (WiBro), and global system for mobile communications (GSM) as a cellular communication protocol. The wired communication may include at least one of, for example, a universal serial bus (USB), a high definition multimedia interface (HDMI), recommended standard 232 (RS-232), and a plain old telephone service (POTS). The network 162 may include a telecommunications network, for example, at least one of a computer network (for example, local area network (LAN) or wide area network (WAN)), Internet, and a telephone network.

Each of the first and second external electronic devices 102 and 104 may be a device which is the same as or different from the electronic device 101. According to an embodiment of the present invention, the server 106 may include a group of one or more servers. According to an embodiment of the present invention, some or all of the operations performed by the electronic device 101 may be performed by another electronic device or a plurality of electronic devices (for example, the electronic device 102 or 104 or the server 106). According to an embodiment of the present invention, when the electronic device 101 should perform some functions or services automatically or by request, the electronic device 101 may make a request for performing at least some of the functions related to the functions or services to another device (for example, the electronic device 102 or 104 or the server 106) instead of performing the functions or services by itself. Another electronic device (for example, the electronic device 102 or 104 or the server 106) may execute the requested functions or additional functions, and transmit a result thereof to the electronic device 101. The electronic device 101 may provide the requested functions or services based on the received result or after additionally processing the received result. To this end, for example, a cloud computing, distributed computing, or client-server computing technology may be used.

FIG. 1 illustrates that the electronic device 101 includes the communication module 170 to communicate with the second external electronic device 104, the server 106, or the like through the network 162. However, according to another embodiment of the present invention, the electronic device 101 may be implemented to operate independently without an additional communication function.

According to an embodiment of the present invention, the server 106 may support driving of the electronic device 101 by conducting at least one of the operations (or functions) performed by the electronic device 101. For example, the server 106 may include a position control server module capable of supporting the position control module 180 implemented in the electronic device 101. For example, the position control server module may include one or more components of the position control module 180, and may perform at least one of the operations (or functions) performed by the position control module 180 (or on behalf of the position control module 180).

The position control module 180 may process at least some of information obtained from other components (for example, the processor 120, memory 130, input/output interface 145, or communication interface 160) and provide the processed information to the user in various ways.

For example, when the electronic device 100 is installed in a wearable device and functions as a display device, according to an embodiment of the present invention, the position control module 180 may control a position of a screen displayed through the display 160. The position control module 180 is described in greater detail below with respect to FIG. 2.

Although the position control module 180 is illustrated as a module separate from the processor 120, at least some of the position control module 180 may be included in the processor 120 or at least another module, and total functions of the position control module 180 may be performed within the shown processor 120 or another processor.

Figure 2:
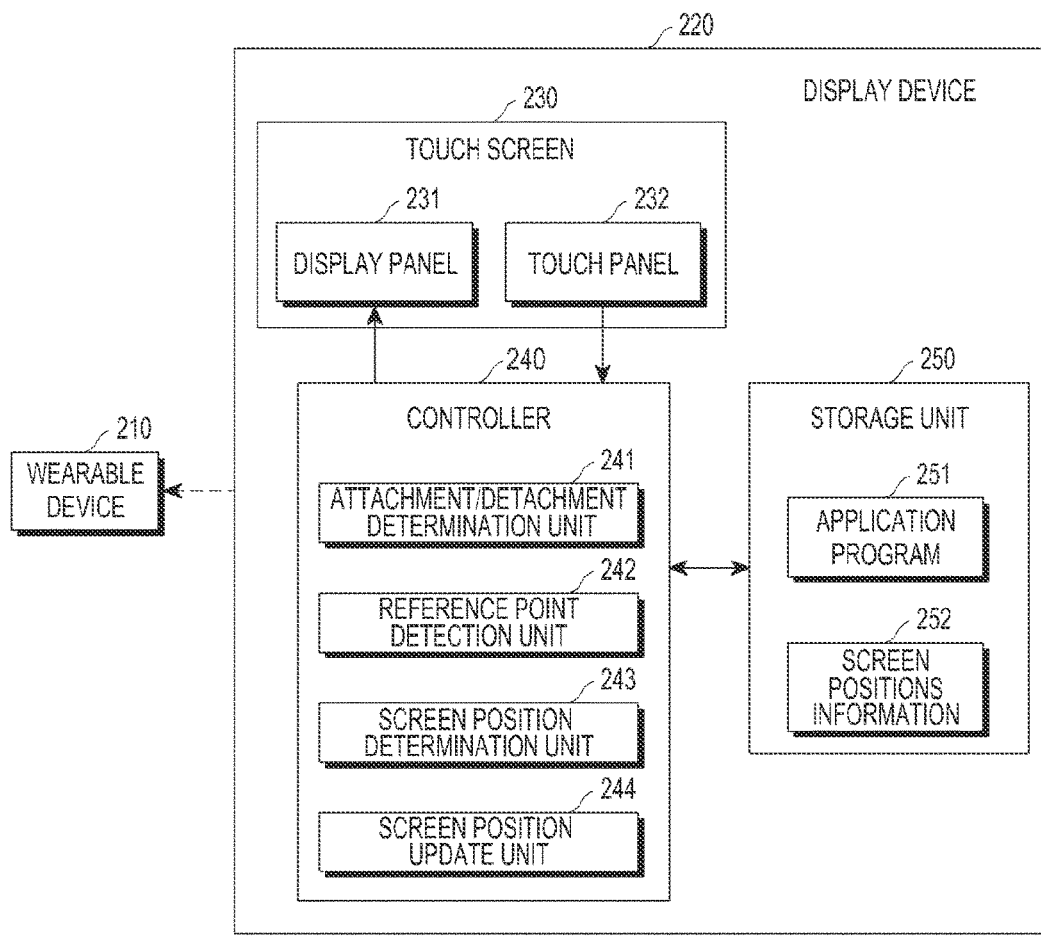
FIG. 2 is a diagram illustrating a configuration of an electronic device, according to an embodiment of the present invention.

FIG. 2 is a diagram illustrating a configuration of an electronic device, according to an embodiment of the present invention. Referring to FIG. 2, an electronic device may be a display device 220 including one or more display means. Herein, the display device 220 may have a display function as a main function, or may be a general electronic device including one or more display means. For example, the display device 220 may be an electronic device (for example, a smart phone) including a touch screen 230.

The display device 220, according to an embodiment of the present invention, includes at least one of the touch screen 230, a controller 240, and a storage unit 250. The touch screen 230 includes a display panel 231 and/or a touch panel 232. The controller 240 includes at least one of an attachment/detachment determination unit 241, a reference point detection unit 242, a screen position determination unit 243, and a screen position update unit 244.

When the display device 220 is mounted on a wearable device 210, the display device 220 may operate as, for example, an HMD device. According to an embodiment of the present invention, a position or size of a screen displayed through the display panel 231 of the display device 220 is controlled to be suitable for a user who wears the wearable device 210. For example, when the display device 220 is mounted on the wearable device 210 to operate in an HMD mode, the screen displayed through the display panel 231 includes two screens corresponding to a left eye and a right eye, as described in greater detail below with respect to FIG. 7.

According to an embodiment of the present invention, when the display device 220 operates in the HMD mode, the controller 240 detects a reference point from the wearable device 210 equipped with the display device 220 and determines a position of the screen displayed in the HMD mode based on the detected reference point.

According to an embodiment of the present invention, when the display device 220 is mounted on the wearable device 210 to operate in the HMD mode, the touch panel 232 included in the display device 220 detects a reference point through contact with one or more conductive parts included in the wearable device 210. For example, when the display device 220 is mounted on the wearable device 210, as the touch panel 232 makes contact with the wearable device 210, the one or more conductive parts included in the wearable device 210 are detected at particular positions in the touch panels 232. Accordingly, a position where the display device 220 is mounted on the wearable device 210 can be determined.

When the reference point detection unit 242 detects a reference point from the wearable device 210, the screen position determination unit 243 determines a position of the screen (for example, a display position of a left screen corresponding to the left eye and a display position of a right screen corresponding to the right eye) to be displayed according to the HMD mode. Further, according to an embodiment of the present invention, the size of the screen to be displayed based on the HMD mode is determined.

Whether the display device 220 operates in the HMD mode may be determined based on whether the execution of the HMD mode is set by the user or may be determined by the attachment/detachment determination unit 241. For example, when the display device 220 is mounted on the wearable device 210, the attachment/detachment determination unit 241 determines that the display device 220 is mounted on the wearable device 210 and switches the display device 220 to the HMD mode.

Further, according to an embodiment of the present invention, the attachment/detachment determination unit 241 determines that the display device 220 is not properly mounted on the wearable device 210 based on a result of the detection by the reference point detection unit 242 and notifies the user of a result of the determination through a sound, vibration, or screen display. For example, when it is determined that the display device 220 is not properly mounted on the wearable device 210, and thus, the screen cannot be normally displayed for the user based on the position determination result by the reference point detection unit 242, the attachment/detachment determination unit 241 informs the user that the display device 220 is not properly mounted without determining the screen position to be displayed.

Information on the screen position determined through the screen position determination unit 243 is stored in the storage unit 250. Screen position information 252 stored in the storage unit 250 may be stored according to each user. When the user of the display device 220 changes, screen position information suitable for the changed user may be read and applied to the screen display.

The storage unit 250 stores an application program 251, and the application program 251 may be an application related to an HMD mode operation of the display device 220. For example, according to an embodiment of the present invention, when the user executes the application program 251 related to the HMD mode operation, the reference point detection unit 242 detects a reference point from the wearable device 210.

The wearable device 210 may be embodied as a predetermined electronic device including one or more functions of the electronic device 100 illustrated in FIG. 1, or may be embodied as a wearable holder for simply holding the display device 220. When the wearable device 210 is an electronic device and the display device 220 is mounted on the wearable device 210, various functions may be provided through communication with the display device 220. For example, when the display device 220 is mounted on the wearable device 210, the display device 220 detects whether the display device 220 is mounted on the wearable device 210 to communicate with the wearable device 210, and determines whether to operate in the HMD mode.

According to an embodiment of the present invention, when the display device 220 is mounted on the wearable device 210, if the mounting of the display device 220 cannot be automatically determined, the user may apply various embodiments of the present invention by executing the application program 251 or by selecting of the HMD mode. Further, according to an embodiment of the present invention, when the wearable device 210 includes functions of the electronic device 100, the attachment/detachment determination unit 241 of the display device 220 automatically determines whether the display device 220 is mounted on the wearable device 210 to automatically switch to the HMD mode.

When the display device 220 operates in the HMD mode while the display device 220 is mounted on the wearable device 210, the screen position update unit 244 determines a screen position again through the detection of the reference point at a preset time interval, in real time, or when a preset condition is met, so as to perform a function of updating the screen position. Information on the updated screen position is stored in the storage unit 250. For example, when an installation position of the display device 220 changes due to an external impact while the user is watching the screen in the HMD mode and the display device 220 is mounted on the wearable device 210, the screen suitable for the changed installation position may be provided through the update of the screen position by the screen position update unit 244.

At least some of the functions of the controller 240 illustrated in FIG. 2 may be included in the position control module 180 or the processor 120 of the electronic device 100 illustrated in FIG. 1. Further, the touch screen 230 or the display panel 231 illustrated in FIG. 2 may correspond to the display 160 of FIG. 1. The storage unit 250 illustrated in FIG. 2 may correspond to the memory 130 illustrated in FIG. 1.

Although the display panel 231 and the touch panel 232 are illustrated as the touch screen 230 in FIG. 2, the display panel 231 and the touch panel 232 may be implemented as a separate panel form rather than a form of one touch screen 230, according to an embodiment of the present invention.

Further, according to an embodiment of the present invention, the display device 220 may be referred to as a first device (or a first electronic device) and the wearable device 210 may be referred to as a second device (or a second electronic device for convenience of the description.

Figure 3:
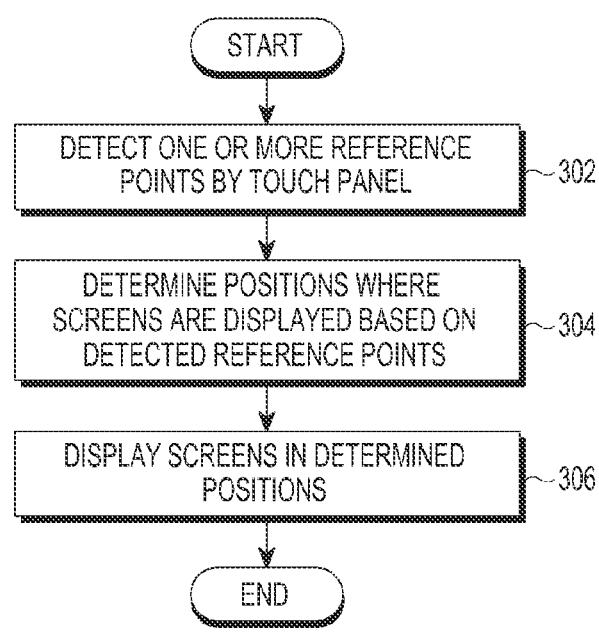
FIG. 3 is a flowchart illustrating a display control process of an electronic device, according to an embodiment of the present invention.

FIG. 3 is a flowchart illustrating an operation process of an electronic device, according to an embodiment of the present invention. Referring to FIG. 3, in step 302, a touch panel of a first device (for example, an electronic device having a display function) contacts conductive parts included in a second device (for example, a wearable device), and thus, one or more reference points are detected.

In step 304, positions where the screens are displayed are determined based on the detected reference point. For example, as the first device is mounted on the second device, according to an embodiment of the present invention, a display position of the screens corresponding to a left eye and a right eye are determined to display the screen in the HMD.

In step 306, the screens are displayed in the determined positions.

At least one of the steps illustrated in FIG. 3 may be omitted, and one or more other steps may be added. Further, the steps of FIG. 3 may be sequentially processed, or sequences of one or more steps may be exchanged with sequences of other steps and then processed. The operations illustrated in FIG. 3 may be performed within the electronic device or may be performed by a server. At least one of the steps illustrated in FIG. 3 may be performed within the electronic device and the remaining steps may be performed by the server.

An example in which an electronic device (for example, a smart phone) is mounted on a wearable device is described in detail below with reference to FIGS. 4 to 6.

Figure 4:
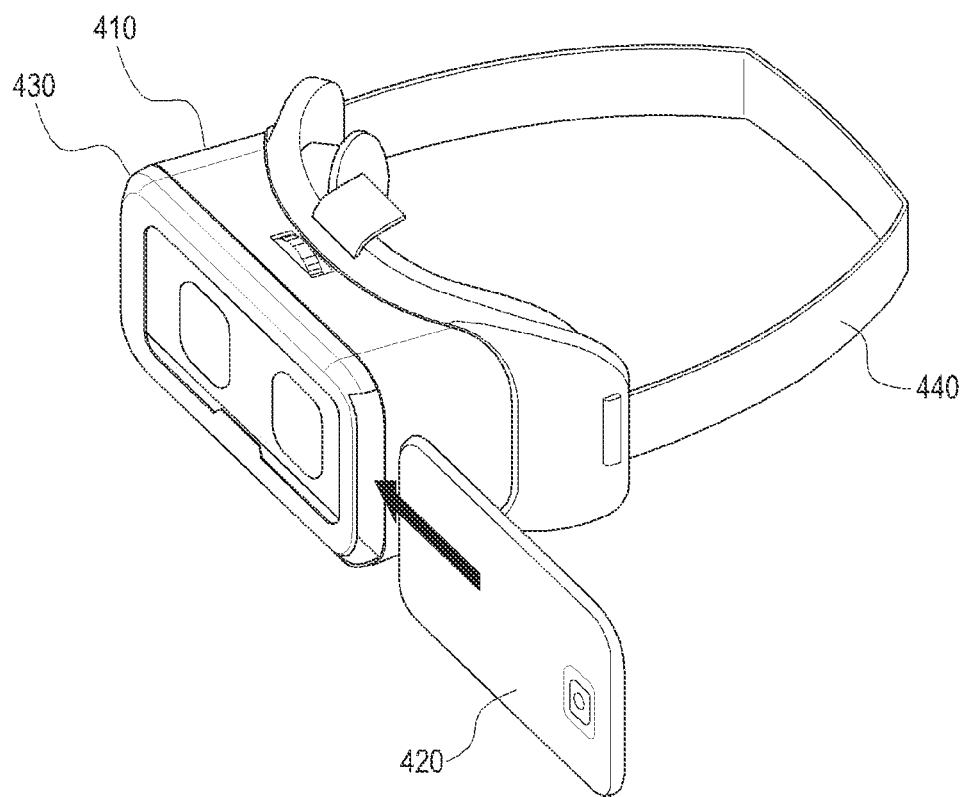
FIG. 4 is a diagram illustrating a head mounted electronic device, according to an embodiment of the present invention.

FIG. 4 is a diagram illustrating an electronic device, according to an embodiment of the present invention.

Referring to FIG. 4, a wearable device 410 may be, for example, the electronic device 102 of FIG. 1. Further, as described above, the wearable device 410 may provide only a function of a simple holder, and does not have a function of communicating with an electronic device 420. The wearable device 410 includes a main body and a cover 430.

When the electronic device 420 is mounted on the wearable device 410, the cover covers a rear edge of the electronic device 420 to maintain a mounted state of the electronic device 420 as illustrated in FIG. 4, so that it remains fixed to the wearable device 410. The wearable device 410 includes a support 440 that can be used when the user puts the wearable device 410 on his/her head.

Further, lenses are located at positions in the wearable device 410 corresponding to both eyes of the wearer. The wearer views a display of the electronic device 420 through the lenses while the electronic device 420 is mounted on the wearable device 410. The wearable device 410 has a mechanical structure to/from which the electronic device 420 can be attached/detached, as illustrated in FIG. 4.

According to an embodiment of the present invention, the wearable device 410 may include one or more of the components of the electronic device 100 of FIG. 1. For example, the wearable device 410 may include at least one of a touch panel, a button, a wheel key, and a touch pad. The touch panel may receive a touch input by the user. The touch input may be a direct touch input on the touch panel or a hovering input approaching the touch panel. When the electronic device 420 is mounted on the wearable device 410, the wearable device 410 may be connected to communicate with the electronic device 420 through an interface such as a USB.

The electronic device 420 may control a function corresponding to an input in response to the input received from the wearable device 410. For example, the electronic device 420 may control a volume or a screen (for example, an image reproduction screen in the HMD mode) in response to the received input.

Figure 5:
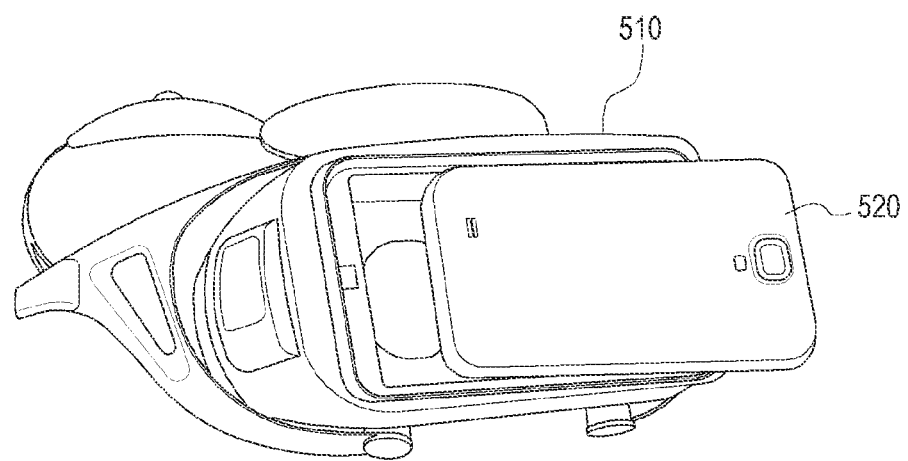
FIG. 5 is a diagram illustrating an electronic device mounted on a wearable device, according to an embodiment of the present invention.

FIG. 5 is a diagram illustrating an electronic device mounted on a wearable device, according to an embodiment of the present invention. FIG. 6 is a diagram illustrating a user wearing the wearable device equipped with the electronic device, according to an embodiment of the present invention.

Figure 6:
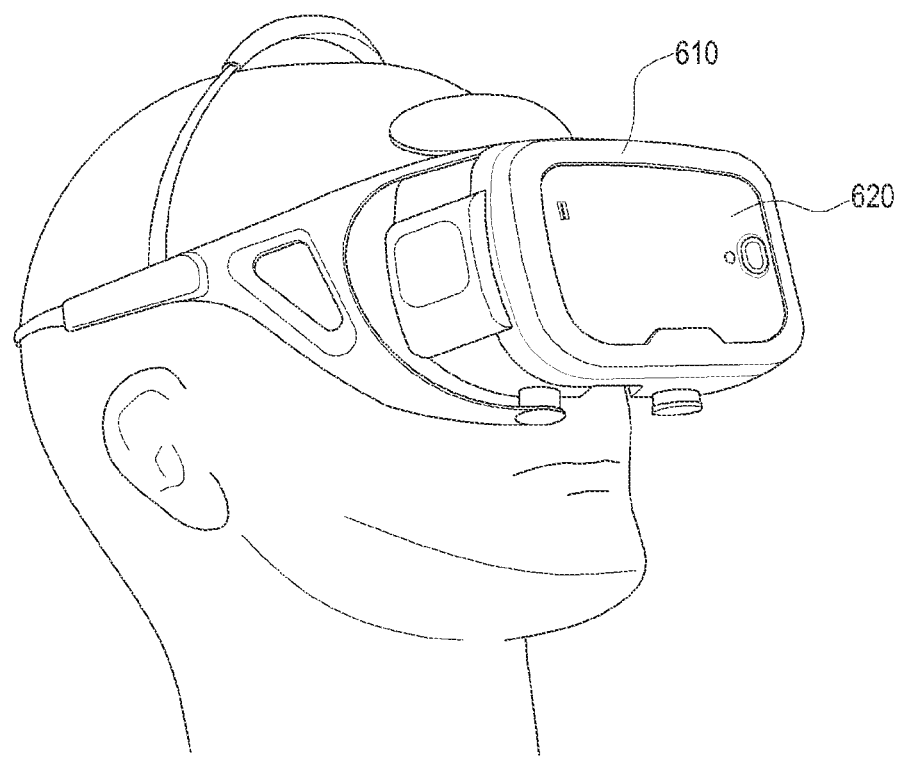
FIG. 6 is a diagram illustrating a user wearing a wearable device equipped with an electronic device, according to an embodiment of the present invention.

Referring to FIGS. 5 and 6, electronic devices 520 and 620 may be the electronic device 100 of FIG. 1, for example, a smart phone including a display means. Wearable devices 510 and 610 may be the electronic device 102 of FIG. 1, for example, a wearable holder serving as only a simple mechanical holder.

As illustrated in FIGS. 5 and 6, the user mounts the electronic device 520 or 620 to the wearable device 510 or 610 such that a display unit (for example, a touch screen) faces a user's face. The use covers the wearable device 510 or 610 to fix the electronic device 520 or 620 to the wearable device 510 or 610. As illustrated in FIG. 6, the user wears the wearable device 610 equipped with the electronic device 620 on his/her head. The wearer may watch the screen of the display of the mounted electronic device 620 through lenses included in the wearable device 610.

Figure 7:
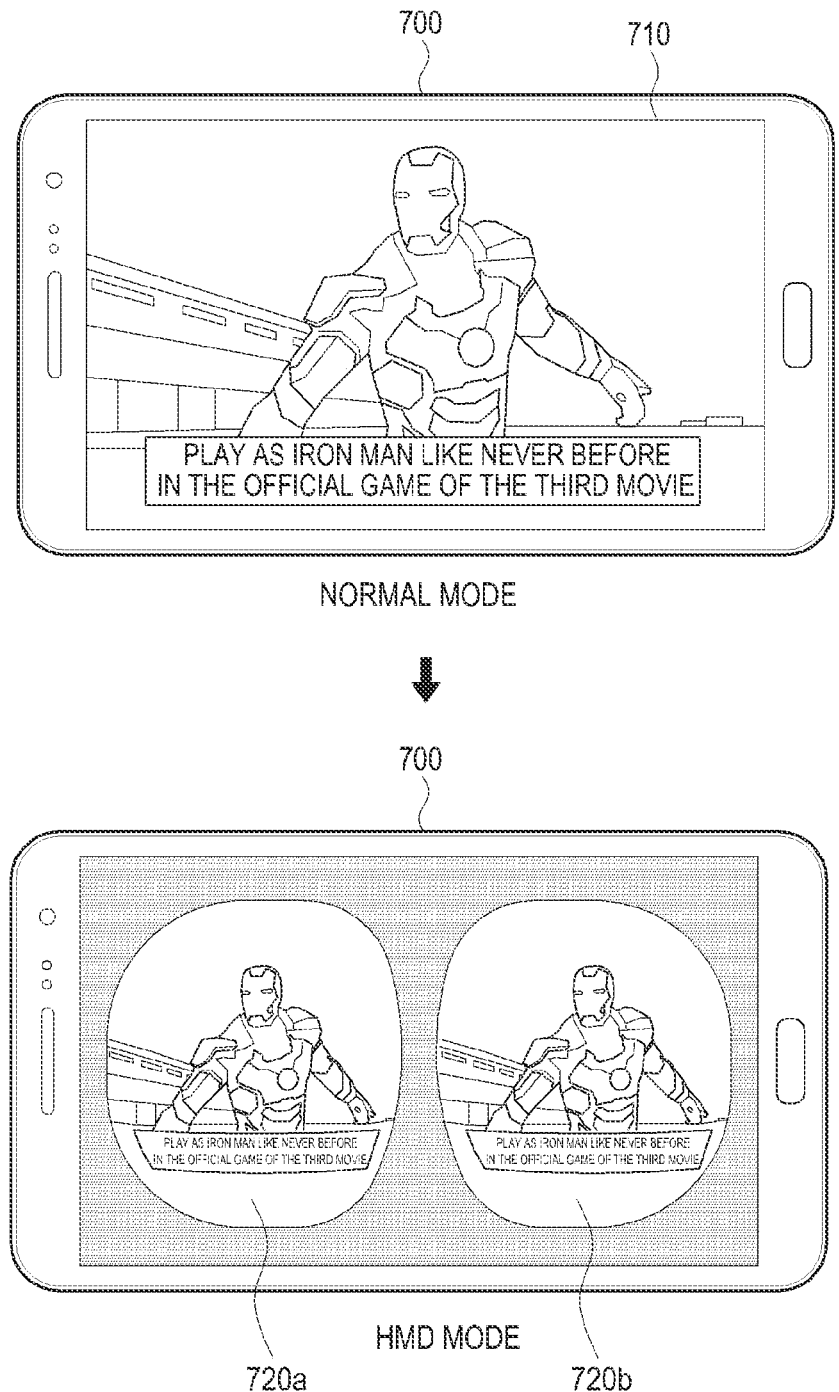
FIG. 7 is a diagram illustrating a screen mode of an electronic device, according to an embodiment of the present invention.

FIG. 7 is a diagram illustrating a screen mode of an electronic device, according to an embodiment of the present invention.

Referring to FIG. 7, an electronic device 700 may be the electronic device 420, 520, or 620 of FIGS. 4 to 6. When the electronic device 700 operates in a normal mode, one operation screen 710 may be displayed, as illustrated in the upper portion of FIG. 7.

According to an embodiment of the present invention, when the electronic device 700 is mounted on the wearable device, the electronic device 700 operates in the HMD mode, as illustrated in the lower portion of FIG. 7. When the electronic device 700 operates in the HMD mode, divided screens, which include a screen 720a corresponding to a user's left eye and a screen 720b corresponding to a user's right eye, are displayed. In the screen of the HMD mode, one image is divided into and displayed as two images 720a and 720b.

According to an embodiment of the present invention, when the electronic device 700 is mounted on the wearable device and operates in the HMD mode, display positions of the screens (the screen 720a corresponding to the left eye and the screen 720b corresponding to the right eye) corresponding to the HMD mode are determined.

Hereinafter, an embodiment of the present invention is described with reference to FIGS. 8 to 12 in which, when the electronic device is mounted on the wearable device and operates in the HMD mode, display positions of the screens (the screen 720a corresponding to the left eye and the screen 720b corresponding to the right eye) corresponding to the HMD mode are determined.

Figure 8:
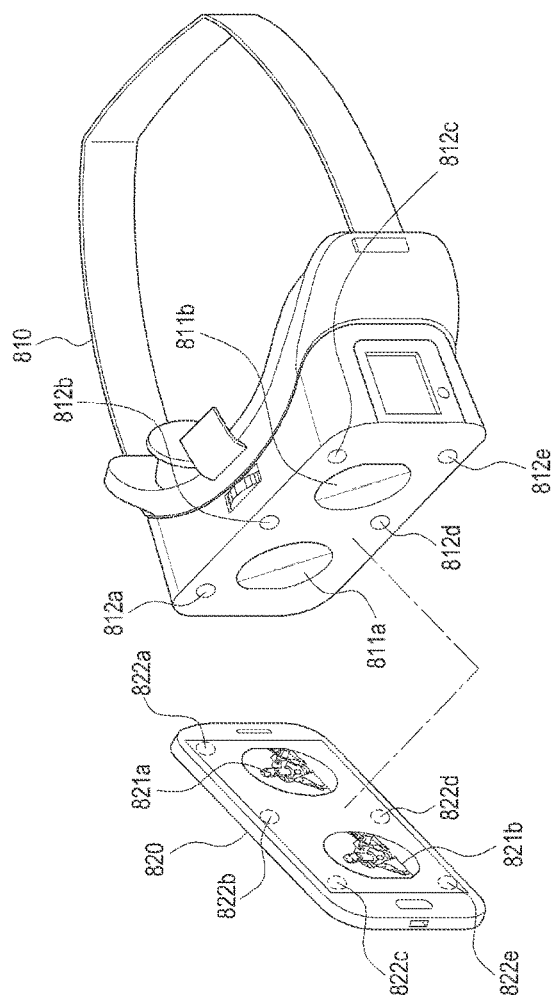
FIG. 8 is a diagram illustrating a method of detecting a reference point in an electronic device, according to an embodiment of the present invention.

FIG. 8 is a diagram illustrating a method of detecting a reference point in an electronic device, according to an embodiment of the present invention. Referring to FIG. 8, when an electronic device 820 is mounted on a wearable device 810 and display screens 821a and 821b of the HMD mode are displayed as display screens of the electronic device 820, a reference point is detected from the wearable device 810. Thus, display positions of the screens 821a and 821b of the HMD mode are determined.

According to an embodiment of the present invention, one or more conductive parts 812a, 812b, 812c, 812d, and 812e are disposed on least some of the front surface (for example, a surface which makes contact with the screen of the display unit of the electronic device 820) of the wearable device 810. The conductive parts 812a, 812b, 812c, 812d, and 812e may be implemented using metal materials having a relatively high capacitance, however embodiments of the present invention are not limited thereto. The conductive parts 812a, 812b, 812c, 812d, and 812e may be formed of materials that can be recognized by the touch panel of the electronic device 820. For example, the conductive parts 812a, 812b, 812c, 812d, and 812e can be formed of any type of material if the material can change a capacitance in the touch panel by contact.

When the electronic device 820 is mounted on the wearable device 810, and thus, the touch screen of the electronic device 820 makes contact with the front surface portion of the wearable device 810, the touch panel included in the touch screen of the electronic device 820 detects the one or more conductive parts included in the wearable device 810.

The electronic device 820 determines positions where the screens 821a and 821b are displayed on a display (for example, the touch screen) based on positions 822a, 822b, 822c, 822d, and 822e of the touch panel, where the conductive parts 812a, 812b, 812c, 812d, and 812e are respectively detected.

The type, form, position, number, shape, and pattern of the materials of the conductive parts 812a, 812b, 812c, 812d, and 812e may be variously implemented. FIG. 8 illustrates an example in which five conductive parts are arranged on the upper left side, the upper middle side, the upper right side, the lower middle side, and the lower right side of the front surface portion of the wearable device 810.

The user who wears the wearable device 810 equipped with the electronic device 820 views the screens 821a and 821b displayed on the display of the electronic device 820 through lenses 811a and 811b of the wearable device 810. According to an embodiment of the present invention, by determining positions of the screens to be displayed according to the installation of the electronic device 820 as describe above, screens suitable for positions of the user's eyes may be displayed regardless of the size, form, type, installation degree, or installation type of the electronic device 820.

Figure 9:
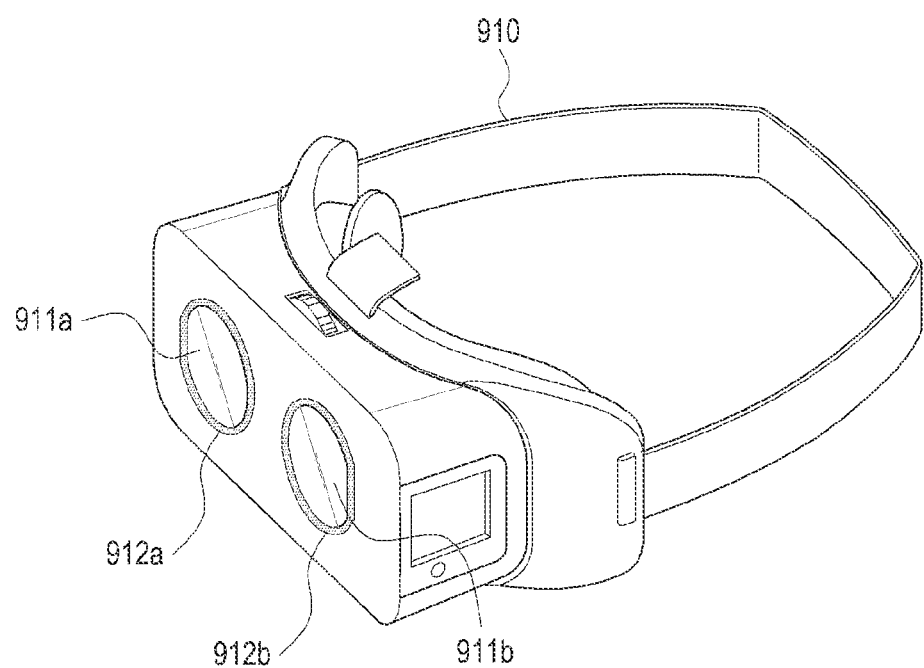
FIG. 9 is a diagram illustrating conductive parts in a wearable device, according to an embodiment of the present invention.

FIG. 9 is a diagram illustrating conductive parts in a wearable device, according to an embodiment of the present invention. Referring to FIG. 9, conductive parts 912a and 912b are arranged in a circular form around the circumference of lens units 911a and 911b located on the front surface of a wearable device 910. According to an embodiment of the present invention, in the positions of the lens units 911a and 911b, pupils may replace the lenses. For example, in the circumference of the pupils, the conductive parts 912a and 912b may be arranged in a circular form. Although the conductive parts 912a and 912b are arranged in the circular form around the circumference of the lens units 911a and 911b in FIG. 9, the conductive parts 912a and 912b may be arranged in a semicircular form or particular positions.

Figure 10:
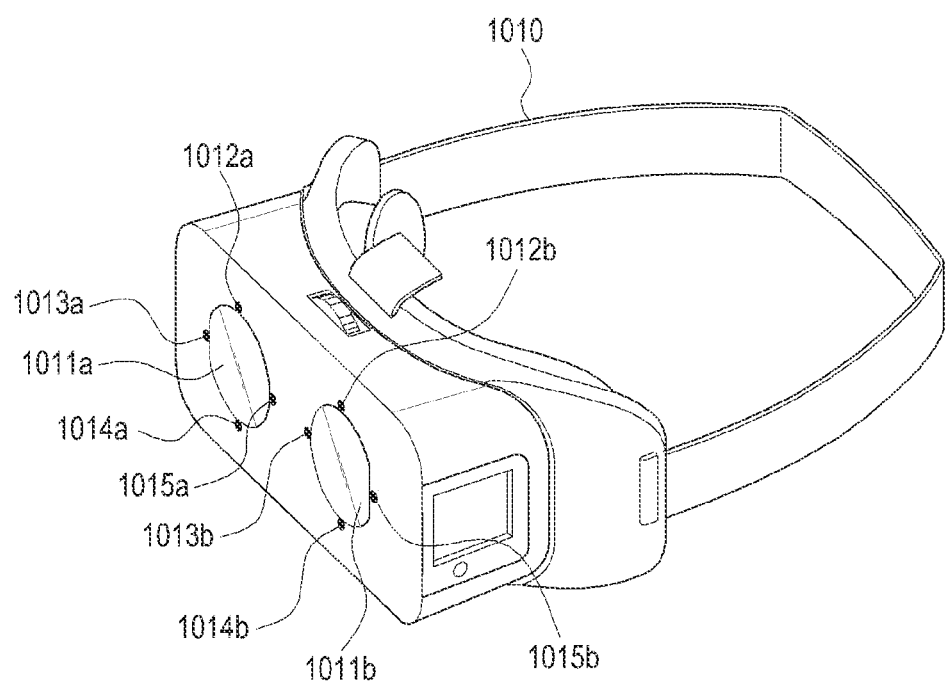
FIG. 10 is a diagram illustrating conductive parts in a wearable device, according to an embodiment of the present invention.

FIG. 10 is a diagram illustrating conductive parts in a wearable device, according to an embodiment of the present invention. Referring to FIG. 10, conductive parts 1012a, 1012b, 1013a, 1013b, 1014a, 1014b, 1015a, and 1015b are arranged around the circumference of lens units 1011a and 1011b located on the front surface of a wearable device 1010. For example, as illustrated in FIG. 10, four conductive parts 1012a, 1013a, 1014a, and 1015a are respectively arranged at the top, left, bottom, and right sides of the circumference of the left lens unit 1011a, and four conductive parts 1012b, 1013b, 1014b, and 1015b are respectively arranged at the top, bottom, left, and right sides of the circumference of the right lens unit 1011b.

Figure 11:
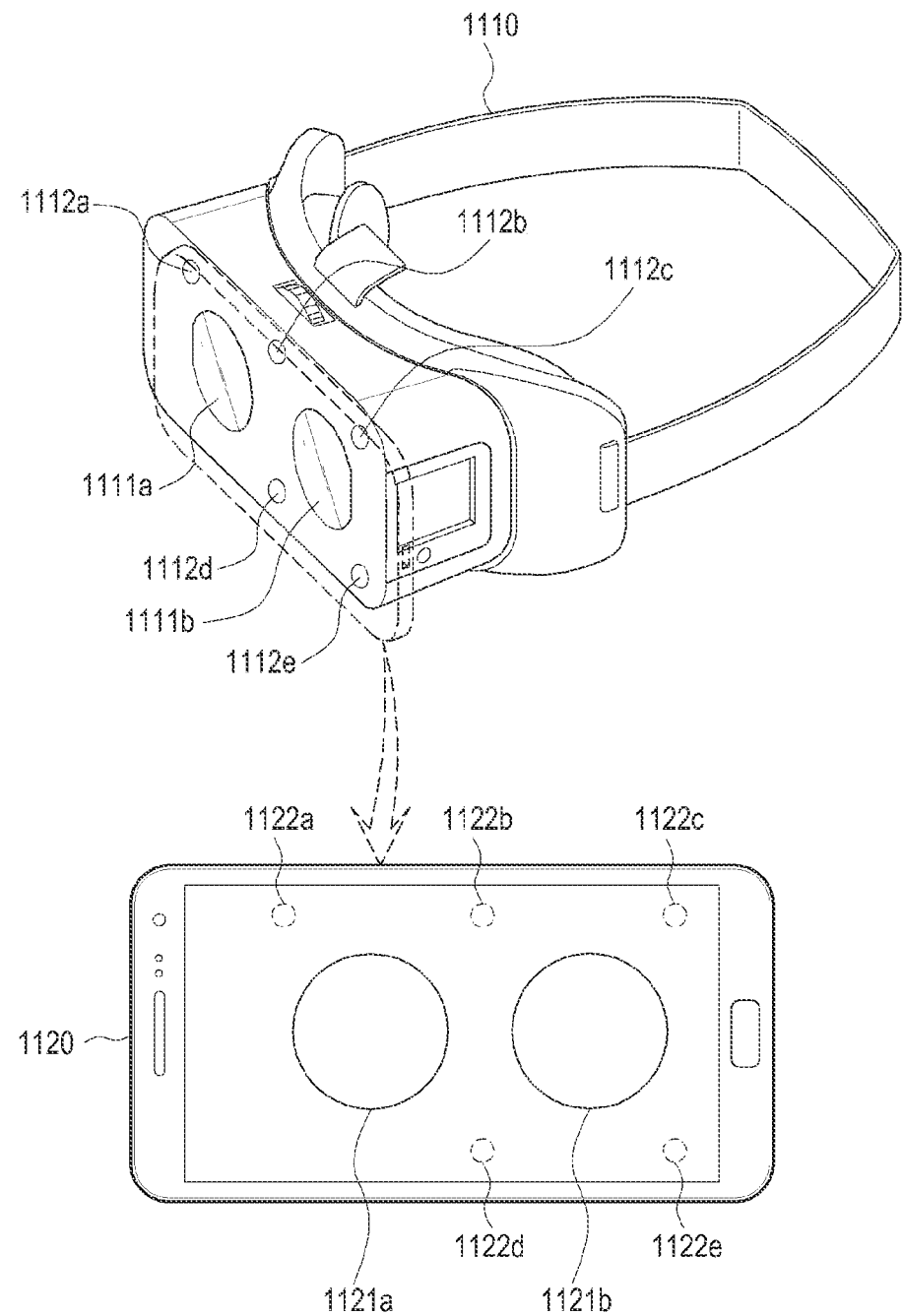
FIG. 11 is a diagram illustrating an installation type of a display device, according to an embodiment of the present invention.

FIG. 11 is a diagram illustrating an installation type of a display device, according to an embodiment of the present invention. Referring to FIG. 11, even when the screen is viewed while an electronic device 1120 is not completely mounted on a wearable device 1110, the screen may be displayed in a proper position where the electronic device 1120 is mounted.

For example, even though the electronic device 1120 is not completely mounted on the wearable device 1110, if the HMD mode is executed, a touch pad of the electronic device 1120 may detect one or more conductive parts 1112a, 1112b, 1112c, 1112d, and 1112e located on the front surface of the wearable device 1110 and display positions 1121a, and 1121b of the screen may be determined from positions 1122a, 1122b, 1122c, 1122d, and 1122e of the touch pad of the electronic device 1120 corresponding to the detected conductive parts 1112a, 1112b, 1112c, 1112d, and 1112e.

Referring to FIG. 11, when the electronic device 1120 is not completely mounted on the wearable device 1110 and leans toward the right, the screen display positions 1121a and 1121b may be displayed toward the right based on the detection of the conductive parts 1112a, 1112b, 1112c, 1112d, and 1112e, so that the user may view the accurately positioned screen through the lens units 1111a and 1111b of the wearable device 1110.

Figure 12:
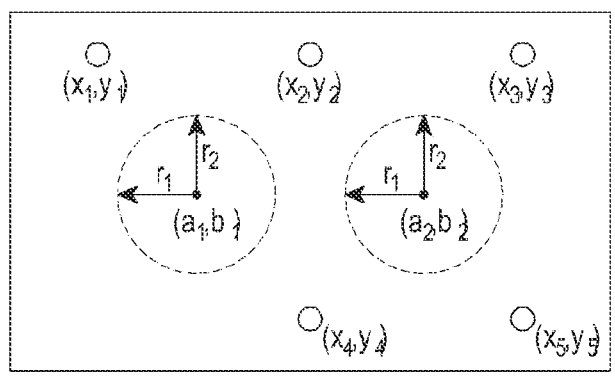
FIG. 12 is a diagram illustrating a method of determining screen display areas from detected reference points, according to an embodiment of the present invention.

FIG. 12 is a diagram illustrating a method of determining screen display areas from detected reference points, according to an embodiment of the present invention. Referring to FIG. 12, positions of the touch pad of the electronic device where conductive parts are detected are illustrated.

In FIG. 12, when positions where conductive parts are detected correspond to (x1, y1), (x2, y2), (x3, y3), (x4, y4), and (x5, y5), a center coordinate (a1, b1) of a left screen to be displayed and a center coordinate (a2, b2) of a right screen to be displayed are calculated from the detected coordinates, and preset sized screens (for example, having preset radiuses) are configured based on the calculated center coordinates.

According to an embodiment of the present invention, FIG. 12 includes a conductive part in a lower right side without a conductive part in the lower left side, and thus left-right asymmetric conductive parts are recognized. When the left-right asymmetric conductive parts are recognized, the left side and the right side of the screen may be identified.

Hereinafter, a display control process in an electronic device is described with reference to FIGS. 13 and 14.

Figure 13:
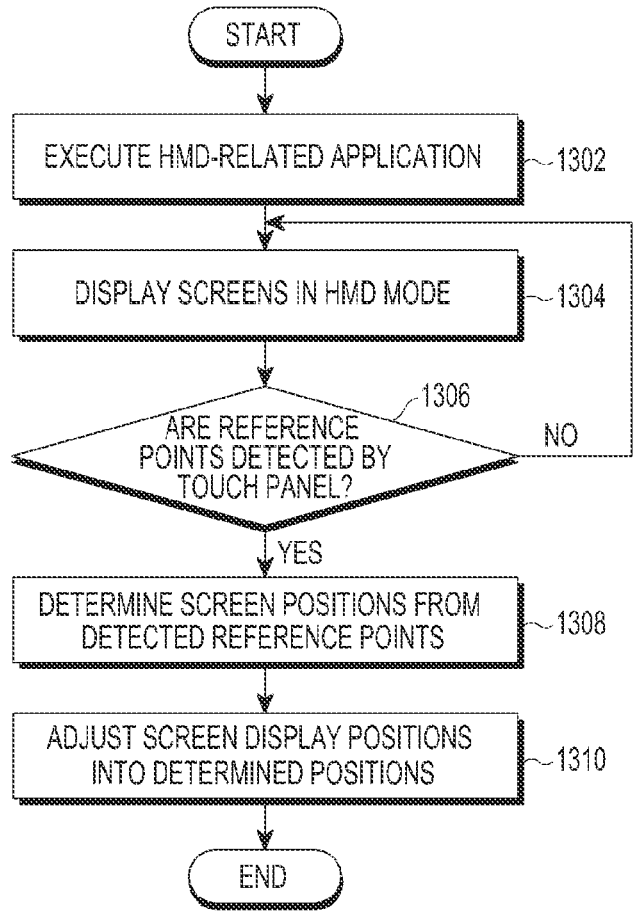
FIG. 13 is a flowchart illustrating a display control process of an electronic device, according to an embodiment of the present invention.

FIG. 13 is a flowchart illustrating a display control process of an electronic device, according to an embodiment of the present invention. Referring to FIG. 13, an HMD-related application is executed, in step 1302, and the electronic device displays an HMD mode screen, in step 1304.

While operating in the HMD mode, the electronic device determines whether reference points are detected from a touch panel, in step 1306. For example, when the electronic device is mounted on the wearable device, a contact by a user's hand or a pen is not generated in the touch panel of the electronic device. However, when conductive parts located on the front surface of the wearable device contact the touch panel, according to an embodiment of the present invention, the conductive parts may be detected and positions where the conductive parts are detected are determined as positions of the reference points.

When the reference points are detected from the touch panel, positions of the screens to be displayed in the HMD mode are determined from the detected reference points, in step 1308. In step 1310, currently displayed screen positions are adjusted to the determined positions.

The screen display positions may be continuously updated by repeating the process of detecting the reference points and controlling the screen display positions.

Figure 14:
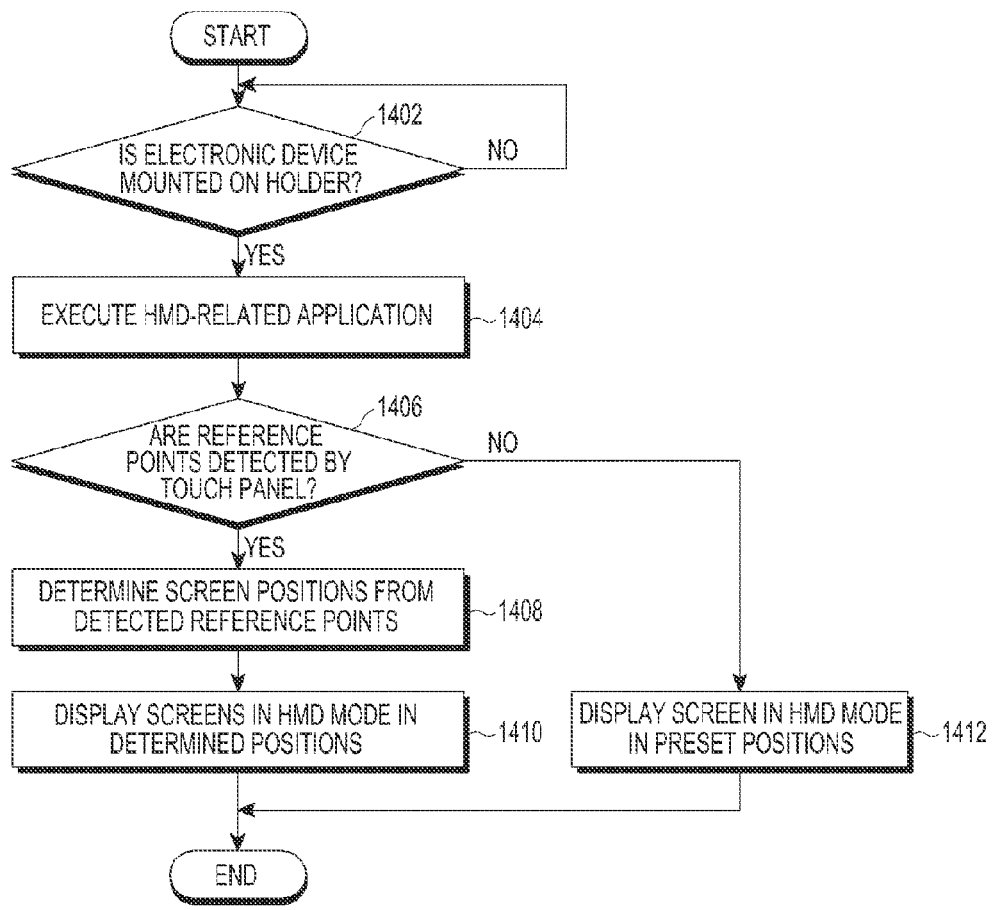
FIG. 14 is a flowchart illustrating a display control process of an electronic device, according to an embodiment of the present invention.

FIG. 14 is a flowchart illustrating a display control process of an electronic device, according to an embodiment of the present invention. Referring to FIG. 14, in step 1402, it is determined whether the electronic device is mounted on a holder of the wearable device. When the electronic device detects the installation in step 1402, the electronic device executes an HMD-related application, in step 1404.

After the execution of the HMD-related application, the electronic device determines whether reference points are detected by the touch panel, in step 1406. When the reference points are detected from the touch panel based on a result of the determination, positions of the screens to be displayed in the HMD mode are determined from the detected reference points, in step 1408. In step 1410, currently displayed screen positions are changed to the determined positions.

In contrast, when the reference points are not detected by the touch panel in step 1406, the screens of the HMD mode are displayed in preset positions, in step 1412.

Figure 15:
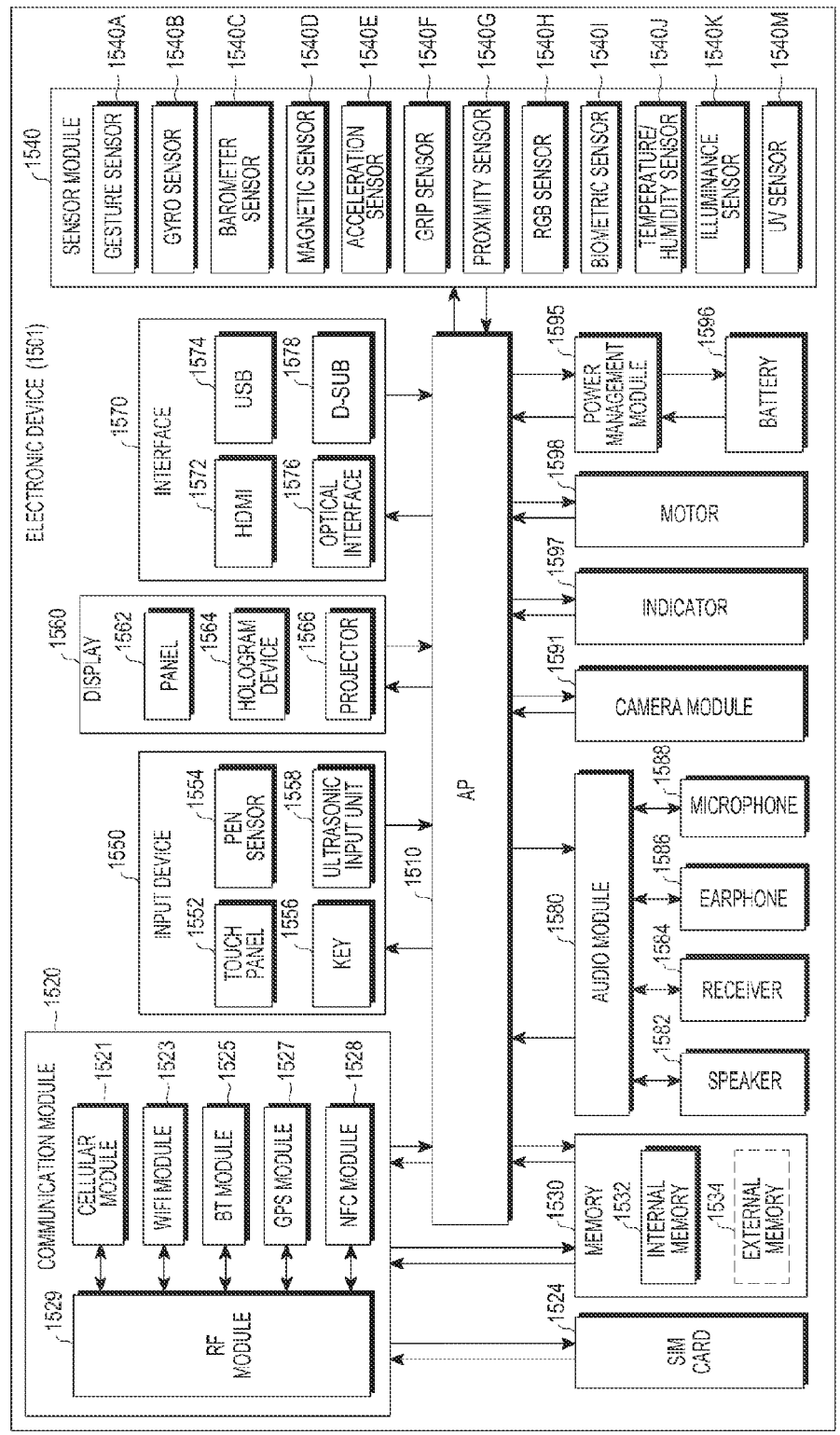
FIG. 15 is a block diagram illustrating a structure of an electronic device, according to an embodiment of the present invention.
Figure 16:
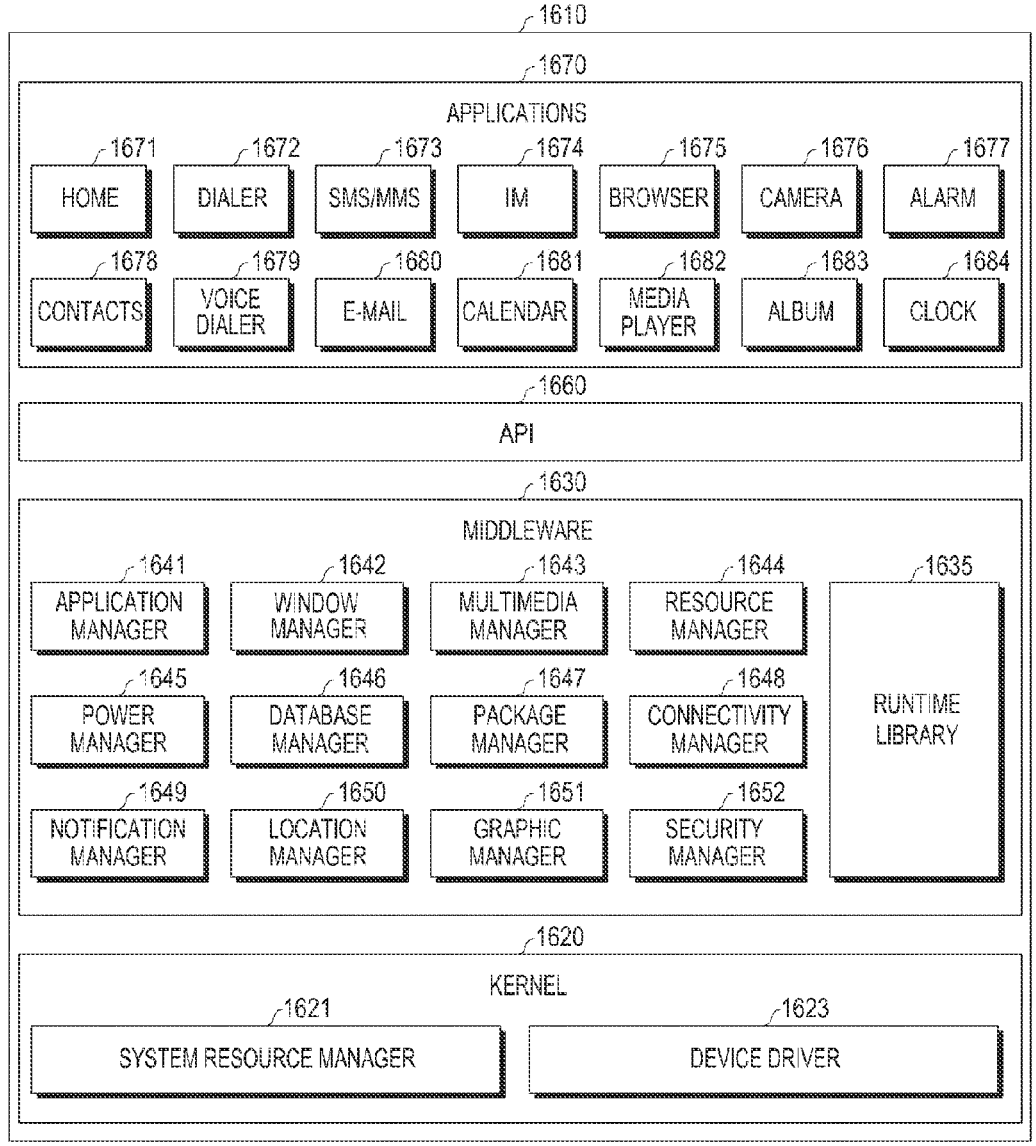
FIG. 16 is a block diagram of a program module, according to an embodiment of the present invention.
Figure 17:
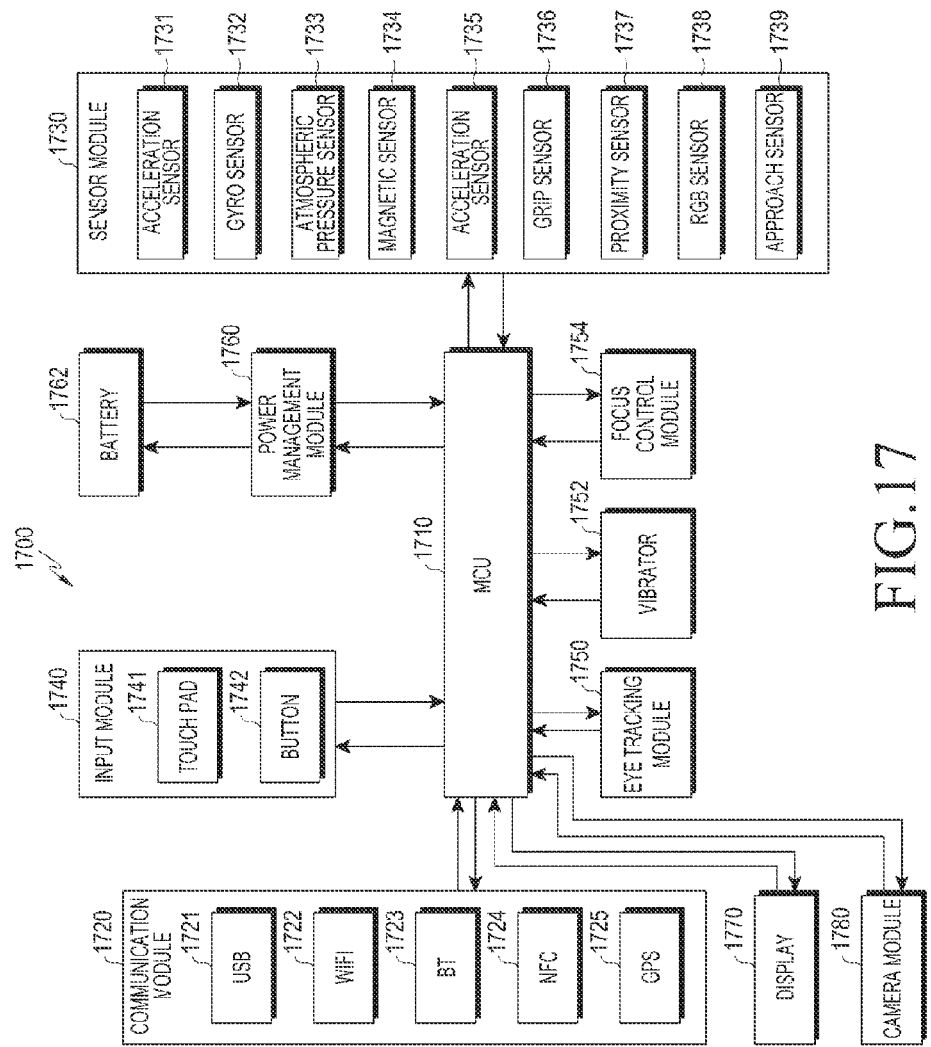
FIG. 17 is a block diagram illustrating a configuration of a wearable device, according to an embodiment of the present invention.

Hereinafter, an implementation example of the first device (for example, the display device) or the second device (for example, the wearable device) is described with reference to FIGS. 15 to 17. FIGS. 15 and 16 illustrate implementation examples of a display device, which is an electronic device, and FIG. 17 illustrates an implantation example of a wearable device.

FIG. 15 is a block diagram of an electronic device, according to an embodiment of the present invention. The electronic device 1501 may include, for example, all or some of the electronic device 101 shown in FIG. 1. The electronic device 1501 includes at least one AP 1510, a communication module 1520, a subscriber identity module (SIM) card 1524, a memory 1530, a sensor module 1540, an input device 1550, a display 1560, an interface 1570, an audio module 1580, a camera module 1591, a power management module 1595, a battery 1596, an indicator 1597, and a motor 1598.

The AP 1510 may control a plurality of hardware or software components connected to the AP 1510 by driving an operating system or an application program, and may perform processing of various pieces of data and calculations. The AP 1510 may be implemented by, for example, a system on chip (SoC). According to an embodiment of the present invention, the AP 1510 may further include a graphic processing unit (GPU) and/or an image signal processor. The AP 1510 may include at least some of the components (for example, a cellular module 1521) illustrated in FIG. 15. The AP 1510 may load commands or data received from at least one of the other components (for example, a non-volatile memory) in a volatile memory, process the loaded commands or data, and store various pieces of data in the non-volatile memory.

The communication module 1520 may have a component equal or similar to the communication interface 160 of FIG. 1. The communication module 1520 includes, for example, a cellular module 1521, a Wi-Fi module 1523, a Bluetooth (BT) module 1525, a GPS module 1527, a near field communication (NFC) module 1528, and a radio frequency RF module 1529.

The cellular module 1521 may provide a voice call, an image call, a short message service (SMS,) or an Internet service through, for example, a communication network. According to an embodiment of the present invention, the cellular module 1521 may distinguish between and authenticate electronic devices 1501 within a communication network by using a SIM (for example, the SIM card 1524). According to an embodiment of the present invention, the cellular module 1521 may perform at least a part of the functions that may be provided by the AP 1510. According to an embodiment of the present invention, the cellular module 1521 may include a CP.

Each of the Wi-Fi module 1523, the BT module 1525, the GPS module 1527, and the NFC module 1528 may include, for example, a processor for processing data transmitted/received through the corresponding module. According to an embodiment of the present invention, at least some (for example, two or more) of the cellular module 1521, the WiFi module 1523, the BT module 1525, the GPS module 1527, and the NFC module 1528 may be included in one integrated chip (IC) or IC package.

The RF module 1529 may transmit/receive, for example, a communication signal (for example, an RF signal). The RF module 1529 may include, for example, a transceiver, a power amp module (PAM), a frequency filter, a low noise amplifier (LNA), or an antenna. According to another embodiment of the present invention, at least one of the cellular module 1521, the WiFi module 1523, the BT module 1525, the GPS module 1527, and the NFC module 1528 may transmit/receive an RF signal through a separate RF module.

The SIM card 1524 may include a card including a SIM and/or an embedded SIM, and contain unique identification information (for example, an integrated circuit card identifier (ICCID)) or subscriber information (for example, an international mobile subscriber identity (IMSI)).

The memory 1530 includes, for example, an internal memory 1532 or an external memory 1534. The internal memory 1532 may include at least one of, for example, a volatile memory (for example, a dynamic random access memory (DRAM), a static RAM (SRAM), a synchronous DRAM (SDRAM), and the like) and a non-volatile memory (for example, a one time programmable read only memory (OTPROM), a programmable ROM (PROM), an erasable PROM (EPROM), an electrically EPROM (EEPROM), a flash memory (for example, a NAND flash memory or a NOR flash memory), a hard driver, or a solid state drive (SSD).

The external memory 1534 may further include a flash drive, for example, a compact flash (CF), a secure digital (SD), a Micro-SD, a Mini-SD, an extreme digital (xD), a memory stick, or the like. The external memory 1534 may be functionally and/or physically connected to the electronic device 1501 through various interfaces.

The sensor module 1540 may measure a physical quantity or detect an operation state of the electronic device 1501, and may convert the measured or detected information into an electrical signal. The sensor module 1540 includes, for example, at least one of a gesture sensor 1540A, a gyro sensor 1540B, an atmospheric pressure (barometer) sensor 1540C, a magnetic sensor 1540D, an acceleration sensor 1540E, a grip sensor 1540F, a proximity sensor 1540G, a color sensor 1540H (for example, red, green, and blue (RGB) sensor), a biometric sensor 1540I, a temperature/humidity sensor 1540J, an illumination sensor 1540K, and an ultra violet (UV) sensor 1540M. Additionally or alternatively, the sensor module 1540 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1540 may further include a control circuit for controlling one or more sensors included therein. In an embodiment of the present invention, the electronic device 1501 may further include a processor configured to control the sensor module 1540 as a part of or separately from the AP 1510, and may control the sensor module 1540 while the AP 1510 is in a sleep state.

The input device 1550 includes, for example, a touch panel 1552, a (digital) pen sensor 1554, a key 1556, or an ultrasonic input device 1558. The touch panel 1552 may use at least one of, for example, a capacitive type, a resistive type, an infrared type, and an ultrasonic type. The touch panel 1552 may further include a control circuit. The touch panel 1552 may further include a tactile layer and provide a tactile reaction to the user.

The (digital) pen sensor 1554 may include, for example, a recognition sheet, which is a part of the touch panel or a separate recognition sheet. The key 1556 may include, for example, a physical button, an optical key or a keypad. The ultrasonic input device 1558 may detect an acoustic wave using a microphone (for example, microphone 1588) of the electronic device 1501 through an input tool generating an ultrasonic signal to identify data.

The display 1560 (for example, the display 160) includes a panel 1562, a hologram device 1564, or a projector 1566. The panel 1562 may include a component equal or similar to the display 160 of FIG. 1. The panel 1562 may be implemented to be, for example, flexible, transparent, or wearable. The panel 1562 may be also configured as one module together with the touch panel 1552. The hologram device 1564 may show a stereoscopic image in the air by using interference of light. The projector 1566 may project light onto a screen to display an image. For example, the screen may be located inside or outside the electronic device 1501. According to an embodiment of the present invention, the display 1560 may further include a control circuit for controlling the panel 1562, the hologram unit 1564, or the projector 1566.

The interface 1570 includes, for example, a high-definition multimedia interface (HDMI) 1572, a USB 1574, an optical interface 1576, or a D-subminiature (D-sub) 1578. The interface 1570 may be included in, for example, the communication interface 160 illustrated in FIG. 1. Additionally or alternatively, the interface 1570 may include, for example, a mobile high-definition link (MHL) interface, an SD card/multi-media card MMC interface, or an infrared data association (IrDA) standard interface.

The audio module 1580 may bilaterally convert, for example, a sound and an electrical signal. At least some components of the audio module 1580 may be included in, for example, the input/output interface 150 illustrated in FIG. 1. The audio module 1580 may process voice information input or output through, for example, a speaker 1582, a receiver 1584, earphones 1586, or a microphone 1588.

The camera module 1591 is a device that may photograph a still image and a dynamic image. According to an embodiment of the present invention, the camera module 1591 may include one or more image sensors (for example, a front sensor or a back sensor), a lens, an image signal processor (ISP) or a flash (for example, LED or xenon lamp).

The power management module 1595 may manage, for example, power of the electronic device 1501. According to an embodiment of the present invention, the power management module 1595 may include a power management integrated circuit (PMIC), a charger IC, or a battery or fuel gauge. The PMIC may have a wired and/or wireless charging scheme. A magnetic resonance scheme, a magnetic induction scheme, or an electromagnetic scheme may be exemplified as the wireless charging method, and an additional circuit for wireless charging, such as a coil loop circuit, a resonance circuit, a rectifier circuit, and the like may be added. The battery gauge may measure, for example, the remaining amount of battery, a charging voltage and current, or temperature. The battery 1596 may include, for example, a rechargeable battery or a solar battery.

The indicator 1597 may show particular statuses of the electronic device 1501 or a part (for example, AP 1510) of the electronic device 1501, for example, a booting status, a message status, a charging status and the like. The motor 1598 may convert an electrical signal to mechanical vibration, and may generate a vibration or haptic effect. Although not shown, the electronic device 1501 may include a processing unit (for example, GPU) for supporting mobile TV. The processing unit for supporting mobile TV may process media data according to a standard of digital multimedia broadcasting DMB, digital video broadcasting DVB, media flow or the like.

Each of the components of the electronic device, according to an embodiment of the present invention, may be implemented by one or more components and the name of the corresponding component may vary depending on a type of the electronic device. The electronic device may include at least one of the above-described elements, and some of the above-described elements may be omitted from the electronic device or the electronic device may further include additional elements. Further, some of the elements of the electronic device may be coupled to form a single entity while performing the same functions as those of the corresponding elements before the coupling.

FIG. 16 is a block diagram illustrating a program module, according to an embodiment of the present invention. A program module 1610 (for example, the program 140) may include an OS for controlling resources related to the electronic device (for example, the electronic device 101) and/or various applications (for example, the application program 147) executed in the operating system.

The programming module 1610 includes a kernel 1620, middleware 1630, an application programming interface (API) 1660, and/or applications 1670. At least some of the program module 1610 may be preloaded in the electronic device or downloaded from the server (for example, the server 106).

The kernel 1620 (for example, the kernel 141) includes, for example, a system resource manager 1621 or a device driver 1623. The system resource manager 1621 may perform the control, allocation, or collection of the system resources. According to an embodiment of the present invention, the system resource manager 1621 may include a process manager, a memory manager, or a file system manager. The device driver 1623 may include, for example, a display driver, a camera driver, a Bluetooth driver, a share memory driver, a USB driver, a keypad driver, a WiFi driver, an audio driver, or an Inter-Process Communication (IPC) driver.

The middleware 1630 may provide a function required by the applications 1670 in common or may provide various functions to the applications 1670 through the API 1660 so that the applications 1670 can efficiently use limited system resources of the electronic device. According to an embodiment of the present invention, the middleware 1630 (for example, the middleware 143) includes, for example, at least one of a run time library 1635, an application manager 1641, a window manager 1642, a multimedia manager 1643, a resource manager 1644, a power manager 1645, a database manager 1646, a package manager 1647, a connectivity manager 1648, a notification manager 1649, a location manager 1650, a graphic manager 1651, and a security manager 1652.

The run time library 1635 may include, for example, a library module that a compiler uses in order to add new functions through a programming language while the application 1670 is executed. For example, the runtime library 1635 may execute management of an input/output, management of a memory, a function associated with an arithmetic function or the like.

The application manager 1641 may manage, for example, a life cycle of at least one application among the applications 1670. The window manager 1642 may manage a GUI resource used in the screen. The multimedia manager 1643 may detect a format required for reproducing various media files and perform encoding or decoding of a media file by using a codec suitable for the corresponding format. The resource manager 1644 may manage resources such as a source code, a memory or a storage space of at least one application among the applications 1670.

The power manager 1645 may manage a battery or power by operating together with a basic input/output system (BIOS), and may provide power information required for the operation. The database manager 1646 may generate, search for, or change a database to be used by at least one of the applications 1670. The package manager 1647 may manage the installation or the updating of applications distributed in the form of package file.

The connectivity manager 1648 may manage wireless connection of, for example, Wi-Fi or Bluetooth. The notification manager 1649 may display or notify an event such as, for example, a received message, an appointment, and a proximity notification to a user without disturbance. The location manager 1650 may manage location information of the electronic device. The graphic manager 1651 may manage graphic effects to be provided to a user and user interfaces related to the graphic effects. The security manager 1652 may provide various security functions required for system security or user authentication. According to an embodiment of the present invention, when the electronic device (for example, electronic device 101) has a call function, the middleware 1630 may further include a telephony manager for managing a voice call function or a video call function of the electronic device.

The middleware 1630 may include a middleware module that forms a combination of various functions of the above-described components. The middleware 1630 may provide modules specialized according to the type of OS in order to provide differentiated functions. In addition, a few exiting components may be dynamically removed from the middleware 1630, or new component elements may be added to the middleware 1630.

The API 1660 (for example, the API 145) is a set of API programming functions, and a different configuration thereof may be provided according to an operating system.

The applications 1670 (for example, the application program 147) include for example, one or more applications which can provide functions such as home 1671, dialer 1672, SMS/MMS 1673, instant message (IM) 1674, browser 1675, camera 1676, alarm 1677, contacts 1678, voice dialer 1679, email 1680, calendar 1681, media player 1682, album 1683, clock 1684, health care (for example, measure exercise quantity or blood sugar), or environment information (for example, atmospheric pressure, humidity, or temperature information).

According to an embodiment of the present invention, the applications 1670 may include an application (hereinafter, referred to as an "information exchange application") supporting information exchange between the electronic device (for example, the electronic device 101) and external electronic devices (for example, the first and second electronic devices 102 and 104). The application related to the information exchange may include, for example, a notification relay application for transferring particular information to the external electronic device or a device management application for managing the external electronic device.

For example, the notification relay application may include a function of transferring, to the external electronic device (for example, the first or second electronic device 102 or 104), notification information generated from other applications of the electronic device 101 (for example, an SMS/MMS application, an e-mail application, a health management application, or an environmental information application). Further, the notification relay application may receive notification information from, for example, the external electronic device and provide the received notification information to the user. The device management application may manage (for example, install, delete, or update), for example, a function for at least a part of the external electronic device (for example, the electronic device 104) communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment of the present invention, the applications 1670 may include an application (for example, health management application) designated according to attributes (for example, a type of electronic device which corresponds to a mobile medical device) of the external electronic device (for example, the first or second electronic device 102 or 104). According to an embodiment of the present invention, the applications 1670 may include an application received from the external electronic device (for example, the server 106, or the first or second external electronic device 102 or 104). According to an embodiment of the present invention, the applications 1670 may include a preloaded application or a third party application that can be downloaded from the server. Names of the components of the program module 1610 may vary depending on the type of operating system.

According to an embodiment of the present invention, at least some of the programming module 1610 may be configured with software, firmware, hardware, or a combination of two or more thereof. At least some of the programming module 1610 may be implemented (for example, executed) by, for example, the processor (for example, the AP 1510). At least some of the programming module 1610 may include, for example, a module, a program, a routine, sets of instructions, or a process for performing one or more functions.

FIG. 17 is a block diagram illustrating a configuration of a wearable device, according to an embodiment of the present invention.

Referring to FIG. 17, a wearable device 1700 may provide a wearer with operations equal or similar to those of the electronic device. The wearable device 1700 includes an MCU 1710, a communication module 1720, a sensor module 1730, an input module 1740, an eye tracking module 1750, a vibrator 1752, a focus control module 1754, a power management module 1760, a battery 1762, a display 1770, and a camera 1780.

The communication module 1720 includes, for example, a USB module 1721, a WiFi module 1722, a BT module 1723, an NFC module 1724, and a GSP module 1725.

The sensor module 1730 includes at least one of, for example, an acceleration sensor 1731, a gyro sensor 1732, an atmospheric pressure sensor 1733, a magnetic sensor 1734, an acceleration sensor 1735, a grip sensor 1736, a proximity sensor 1737, an RGB sensor 1738, and an approach sensor 1739.

The input module 1740 includes a touch pad 1741 and a button 1742.

The display 1770 can be installed to be fixed to a main body instead of having a structure in which the electronic device (for example, the display device) is attached to/detached from the wearable device 1700. The display 1770 may be installed in the main body to provide the user with screens through the lens units illustrated in FIGS. 4 to 6, instead of the display of the mounted electronic device. The display 1770 may display a screen based on an augmented reality operation or a transparent operation, according to an embodiment of the present invention. The camera 1780 may be installed on the front surface of the main body 202 and photograph the front of the wearer.

The wearable device 1700 may provide the wearer with the augmented reality operation and the transparent operation equal or similar to those of the electronic device independently from the mounted electronic device.

The term "module" or "functional unit" used herein may refer to, for example, a unit including one or more combinations of hardware, software, and firmware. The term "module" or "functional unit" may be used interchangeably with, for example, the term "unit", "logic", "logical block", "component", or "circuit". The module or functional unit may be a minimum unit of an integrated component element or a part thereof. The module may be a minimum unit for performing one or more functions or a part thereof. The module or functional unit may be mechanically or electronically implemented. For example, according to an embodiment of the present invention, the module or functional unit may include at least one of an application specific integrated circuit (ASIC) chip, a field programmable gate array (FPGA), and a programmable-logic device for performing operations, which are known or are to be developed hereinafter.

According to an embodiment of the present invention, at least some of the devices (for example, modules or functions thereof) or the methods (for example, operations) may be implemented by a command stored in a computer-readable storage medium in a programming module form. When the command is executed by one or more processors (for example, the processor 120), the one or more processors may execute a function corresponding to the command. The computer-readable storage medium may be, for example, the memory 130.

The computer readable recoding medium may include magnetic media, such as a hard disk, a floppy disk, and a magnetic tape, optical media, such as a compact disc read only memory (CD-ROM) and a DVD, magneto-optical media, such as a floptical disk, and a hardware device specially configured to store and execute a program instruction (for example, a programming module), such as a ROM, a RAM, a flash memory, and the like. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present invention, and vice versa.

Any of the modules or programming modules, according to various embodiments of the present invention, may include at least one of the above described elements, exclude some of the elements, or further include other additional elements. The operations performed by the modules, the programming module, or other elements, according to various embodiments of the present invention, may be executed in a sequential, parallel, repetitive, or heuristic manner. Further, some operations may be executed according to another order or may be omitted, or other operations may be added.

According to an embodiment of the present invention, a storage medium storing commands is provided. When the commands are executed by one or more processors, one or more operations may be performed by the one or more processors. The one or more operations may include an operation for determining screen display positions by an HMD mode based on one or more reference points detected from a touch panel of the electronic device, and an operation for providing a control to display the screens of the HMD mode in the determined positions.

While the invention has been shown and described with reference to certain embodiments thereof, it will be understood by those skilled in the art that various changes in form and detail may be made therein without departing from the spirit and scope of the invention as defined by the appended claims.

What is claimed is:

1. An electronic device comprising:
   a touch panel configured to detect one or more conductive parts disposed on a front surface of a wearable device on which the electronic device is mountable, wherein each of the one or more conductive parts on the wearable device comprises one of one or more reference points;
   a processor configured to determine screen display positions for a Head Mounted Display (HMD) mode based on positions of the one or more reference points; and
   a display unit configured to display screens in the HMD mode at the screen display positions.

2. The electronic device of claim 1, wherein the one or more conductive parts are arranged in a circular form around a circumference of each lens unit located on the front surface of the wearable device.

3. The electronic device of claim 1, wherein the processor is further configured to determine whether the electronic device is mounted on a wearable device, and determine the one or more reference points through the touch panel when the electronic device is mounted on the wearable device.

4. The electronic device of claim 1, wherein the processor is further configured to determine the one or more reference points at a preset time interval while displaying the screens in the HMD mode.

5. The electronic device of claim 1, wherein the processor is further configured to determine whether the electronic device is properly mounted on a wearable device based on the one or more reference points, and provide a notification that the electronic device is not properly mounted when the electronic device is not properly mounted on the wearable device.

6. A wearable device comprising:
   a cover having a front surface disposed to mount a display device;
   a support configured to attach the wearable device to a head of a user;
   lens units disposed on portions of the front surface corresponding to left and right eyes of the user; and
   one or more conductive parts disposed on the front surface for contact with the display device,
   wherein each of the one or more conductive parts disposed on the front surface for contact with the display device comprises one of one or more reference points, and
   wherein screen display positions on the display device are determined based on the one or more reference points.

7. The wearable device of claim 6, further comprising an interface unit configured to communicate with the display device when the display device is mounted in the wearable device.

8. The wearable device of claim 6, wherein the one or more conductive parts are arranged in a circular form around a circumference of each of the lens units.

9. The wearable device of claim 6, further comprising:
   the display device mountable on the wearable device, comprising:
      a touch panel configured to detect one or more reference points from the one or more conductive parts;
      a processor configured to determine screen display positions based on positions of the one or more reference points; and
      a display configured to display screens at the screen display positions which correspond to positions of the lens units.

10. A method of controlling a display of an electronic device, the method comprising:
    detecting, by a touch panel of the electronic device, one or more conductive parts disposed on a front surface of a wearable device on which the electronic device is being mounted, wherein each of the one or more conductive parts on the wearable device comprises one of one or more reference points;
    determining screen display positions for a Head Mounted Display (HMD) mode based on positions of the one or more reference points; and
    displaying screens in the HMD mode at the screen display positions.

11. The method of claim 10, wherein the one or more conductive parts are arranged in a circular form around a circumference of each lens unit located on the front surface of the wearable device.

12. The method of claim 10, further comprising:
    determining whether the electronic device is mounted on a wearable device.

13. The method of claim 10, further comprising determining the one or more reference points at a preset time interval while displaying the screens in the HMD mode.

14. The method of claim 10, further comprising:
determining whether the electronic device is properly mounted on a wearable device based on the one or more reference points; and
provide a notification that the electronic device is not properly mounted when the electronic device is not properly mounted on the wearable device.

15. The method of claim 10, further comprising:
detecting that the electronic device is mounted on a wearable device; and
executing an application related to the HMD mode in response to the detection.

16. A non-transitory computer-readable recording medium storing a program to be performed on a computer, the program comprising instructions executable on one or more processors to perform the process of:
detecting, by a touch panel of an electronic device, one or more conductive parts disposed on a front surface of a wearable device on which the electronic device is being mounted, wherein each of the one or more conductive parts on the wearable device comprises one of one or more reference points;
determining, by a processor, screen display positions for a Head Mounted Display (HMD) mode based on one or more reference points; and
providing a command to display screens in the HMD mode at the determined screen display positions.

17. An electronic device comprising:

a touch panel configured to detect one or more conductive parts which the touch panel contacts when the electronic device is mounted on a wearable device, wherein each of the one or more conductive parts on the wearable device comprises one of one or more reference points;

a processor configured to determine first and second screen display positions, corresponding to positions of first and second lens units of the wearable device, based on positions of the one or more reference points; and a display unit configured to display first and second screens at the first and second screen display positions.

* * * * *